(12) United States Patent
Lu et al.

(10) Patent No.: US 10,915,756 B2
(45) Date of Patent: Feb. 9, 2021

(54) METHOD AND APPARATUS FOR DETERMINING (RAW) VIDEO MATERIALS FOR NEWS

(71) Applicant: Baidu USA LLC, Sunnyvale, CA (US)

(72) Inventors: Darning Lu, Sunnyvale, CA (US); Hao Tian, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 50 days.

(21) Appl. No.: 16/460,301

(22) Filed: Jul. 2, 2019

(65) Prior Publication Data
US 2021/0004602 A1    Jan. 7, 2021

(51) Int. Cl.
*G06K 9/00* (2006.01)
*G06F 40/295* (2020.01)

(52) U.S. Cl.
CPC ....... *G06K 9/00731* (2013.01); *G06F 40/295* (2020.01); *G06K 9/00221* (2013.01); *G06K 9/00456* (2013.01); *G06K 9/00463* (2013.01); *G06K 9/00744* (2013.01)

(58) Field of Classification Search
CPC .......... G06K 9/00731; G06K 9/00221; G06K 9/00456; G06K 9/00463; G06K 9/00744; G06F 40/295
See application file for complete search history.

(56) References Cited

U.S. PATENT DOCUMENTS

| | | | | |
|---|---|---|---|---|
| 6,038,573 A | * | 3/2000 | Parks | G06F 40/117 715/202 |
| 8,037,496 B1 | * | 10/2011 | Begeja | H04N 21/23418 725/53 |
| 8,775,436 B1 | * | 7/2014 | Zhou | G06F 16/35 707/748 |
| 2002/0126143 A1 | * | 9/2002 | Bae | H04N 21/8153 715/723 |
| 2002/0175932 A1 | * | 11/2002 | Yu | G06F 16/739 715/720 |

* cited by examiner

*Primary Examiner* — David F Dunphy
(74) *Attorney, Agent, or Firm* — Nixon Peabody LLP (57) ABSTRACT

The present disclosure discloses a method and apparatus for determining video material of news. The method for determining video material of news comprises: acquiring a weighted score value of a score of a keyword of a news text in a plurality of dimensions; filtering a keyword set of news based on the weighted score value of the score of the keyword; searching a pre-selected video using the keyword set of the news; and determining video material of the news based on the pre-selected video. The present disclosure improves the consistency between the video material of the news and the news text.

21 Claims, 6 Drawing Sheets

Apparatus for determining video material of news 500

Acquiring unit 510

Filtering unit 520

First searching unit 530

First determining unit 540

First recognizing unit 550

Second searching unit 560

Extracting unit 570

Second recognizing unit 580

Second determining unit 590

METHOD AND APPARATUS FOR DETERMINING (RAW) VIDEO MATERIALS FOR NEWS

TECHNICAL FIELD

The present disclosure relates to the field of media technology, specifically to the field of news media technology, and more specifically to a method and apparatus for determining video material of news.

BACKGROUND

Artificial Intelligence is abbreviated as AI in English. AI is a new technical science that researches and develops theories, methods, techniques and application systems for simulating, extending and expanding human intelligence. AI is a branch of computer science, and it attempts to understand the essence of intelligence and produce a new intelligent machine that can respond in a way similar to the human intelligence. The research in this field include robotics, language recognition, image recognition, natural language processing, expert systems, etc.

When news is produced, for a news text, video material matching the news text needs to be provided. At present, the video material matching the news text is mainly manually looked up. Specifically, for a news text (including the full text of news and/or the summary paragraph in the full text of the news) that needs to be equipped with a video, the video content is manually browsed, and the video material of the video is manually selected according to the content of the news text, to complete the production of the news.

SUMMARY

Embodiments of the present disclosure provide a method and apparatus for determining video material of news.

In a first aspect, the embodiments of the present disclosure provide a method for determining video material of news. The method includes: acquiring a weighted score value of a score of a keyword of a news text in a plurality of dimensions, the score of the keyword of the news text in the plurality of dimensions including: a score of the keyword determined based on a correlation between a word obtained by segmenting the news text and a news title; filtering a keyword set of news based on the weighted score value of the score of the keyword; searching a pre-selected video using the keyword set of the news; and determining video material of the news based on the pre-selected video.

In some embodiments, the acquiring a weighted score value of a score of a keyword of a news text in a plurality of dimensions includes at least one of: acquiring the score of the keyword of the news text using an attention model of extracting the keyword, wherein the acquiring the score of the keyword of the news text using an attention model of extracting the keyword includes acquiring, using the attention model of extracting the keyword, the score of the keyword determined based on the correlation between the word obtained by segmenting the news text and the news title; acquiring the score of the keyword of the news text using a TF-IDF; or acquiring the score of the keyword of the news text using a domain dictionary of a different granularity.

In some embodiments, the acquiring the score of the keyword of the news text using an attention model of extracting the keyword includes: acquiring a score of the word obtained by segmenting the news text using at least one of following word segmentation tools: a word segmentation tool based on a score of a length of the obtained word; a word segmentation tool based on a score of a correlation between the obtained word and the news title; and a word segmentation tool based on scoring, by an attention mechanism, on the word obtained by segmenting the news text; acquiring a weight corresponding to the score of the obtained word; and using a product of the score of the obtained word and the weight corresponding to the score of the obtained word as the score of the keyword of the news text.

In some embodiments, the acquiring a weight corresponding to the score of the obtained word includes: acquiring the weight corresponding to the score of the obtained word using a first weight distribution model, the first weight distribution model being configured to: predict the weight corresponding to the score of the obtained word based on the score of the word obtained by segmenting the news text using various word segmentation tools.

In some embodiments, the acquiring a weighted score value of a score of a keyword of a news text in a plurality of dimensions includes: acquiring a keyword weight corresponding to the acquired score of the keyword using a second weight distribution model, the second weight distribution model being configured to: predict the keyword weight corresponding to the acquired score of the keyword based on the score of the keyword of the news text in the plurality of dimensions.

In some embodiments, the determining video material of the news based on the pre-selected video includes: acquiring a video description information set for the pre-selected video, the video description information set including: a recognition result obtained by performing named entity recognition on meta information of the pre-selected video; and/or a tag of the pre-selected video; and determining a video in the video description information set as the video material of the news, the video including the keyword set of the news.

In some embodiments, the method further includes: recognizing a person name in the news text; searching a video based on the person name to obtain a to-be-selected video; extracting a key frame in the to-be-selected video; recognizing a human face in the key frame to obtain identity information of the human face; and determining the to-be-selected video as the video material of the news, in response to the identity information of the human face conforming to the person name.

In some embodiments, the method further includes: segmenting, in response to a play duration of the video material of the news exceeding a play duration required by the news, the video material of the news based on a video frame having a changed scene in the video material of the news; and updating the video material of the news using the segmented video material.

In some embodiments, the method further includes: playing the video material of the news when the news text is broadcasted.

In some embodiments, the news text includes: a full text of the news and/or a summary paragraph in the full text of the news.

In a second aspect, the embodiments of the present disclosure provide an apparatus for determining video material of news. The apparatus includes: an acquiring unit, configured to acquire a weighted score value of a score of a keyword of a news text in a plurality of dimensions, the score of the keyword of the news text in the plurality of dimensions including: a score of the keyword determined based on a correlation between a word obtained by segmenting the news text and a news title; a filtering unit, configured to filter a keyword set of news based on the weighted score value of the score of the keyword; a first searching unit, configured to search a pre-selected video using the keyword set of the news; and a first determining unit, configured to determine video material of the news based on the pre-selected video.

In some embodiments, the acquiring unit is further configured to perform at least one of: acquiring the score of the keyword of the news text using an attention model of extracting the keyword, wherein the acquiring the score of the keyword of the news text using an attention model of extracting the keyword includes acquiring, using the attention model of extracting the keyword, the score of the keyword determined based on the correlation between the word obtained by segmenting the news text and the news title; acquiring the score of the keyword of the news text using a TF-IDF; or acquiring the score of the keyword of the news text using a domain dictionary of a different granularity.

In some embodiments, the acquiring unit is further configured to: acquire a score of the word obtained by segmenting the news text using at least one of following word segmentation tools: a word segmentation tool based on a score of a length of the obtained word; a word segmentation tool based on a score of a correlation between the obtained word and the news title; and a word segmentation tool based on scoring, by an attention mechanism, on the word obtained by segmenting the news text; acquire a weight corresponding to the score of the obtained word; and use a product of the score of the obtained word and the weight corresponding to the score of the obtained word as the score of the keyword of the news text.

In some embodiments, the acquiring unit is further configured to: acquire the weight corresponding to the score of the obtained word using a first weight distribution model, the first weight distribution model being configured to: predict the weight corresponding to the score of the obtained word based on the score of the word obtained by segmenting the news text using various word segmentation tools.

In some embodiments, the acquiring unit is further configured to: acquire a keyword weight corresponding to the acquired score of the keyword using a second weight distribution model, the second weight distribution model being configured to: predict the keyword weight corresponding to the acquired score of the keyword based on the score of the keyword of the news text in the plurality of dimensions.

In some embodiments, the first determining unit is further configured to: acquire a video description information set for the pre-selected video, the video description information set including: a recognition result obtained by performing named entity recognition on meta information of the pre-selected video; and/or a tag of the pre-selected video; and determine a video in the video description information set as the video material of the news, the video including the keyword set of the news.

In some embodiments, the apparatus further includes: a first recognizing unit, configured to recognize a person name in the news text; a second searching unit, configured to search a video based on the person name to obtain a to-be-selected video; an extracting unit, configured to extract a key frame in the to-be-selected video; a second recognizing unit, configured to recognize a human face in the key frame to obtain identity information of the human face; and a second determining unit, configured to determine the to-be-selected video as the video material of the news, in response to the identity information of the human face conforming to the person name.

In some embodiments, the apparatus further includes: a segmenting unit, configured to segment, in response to a play duration of the video material of the news exceeding a play duration required by the news, the video material of the news based on a video frame having a changed scene in the video material of the news; and an updating unit, configured to update the video material of the news using the segmented video material.

In some embodiments, the apparatus further includes: a playing unit, configured to play the video material of the news when the news text is broadcasted.

In a third aspect, the embodiments of the present disclosure provide an electronic device/terminal/server, including one or more processors; and a storage device, configured to store one or more programs. The one or more programs, when executed by the one or more processors, cause the one or more processors to implement the method described in any embodiment.

In a fourth aspect, the embodiments of the present disclosure provide a computer readable medium storing a computer program. The program, when executed by a processor, implements the method described in any embodiment.

In a fifth aspect, the embodiments of the present disclosure provide a server. The server includes: an interface; a storage device, storing one or more programs; and one or more processors, operatively connected to the interface and the storage device to: acquire a weighted score value of a score of a keyword of a news text in a plurality of dimensions, the score of the keyword of the news text in the plurality of dimensions including: a score of the keyword determined based on a correlation between a word obtained by segmenting the news text and a news title; filter a keyword set of news based on the weighted score value of the score of the keyword; search a pre-selected video using the keyword set of the news; and determine video material of the news based on the pre-selected video.

In a sixth aspect, the embodiments of the present disclosure provide a computer readable storage medium, storing a computer program. The computer program, when executed by one or more processors, causes the one or more processors to: acquire a weighted score value of a score of a keyword of a news text in a plurality of dimensions, the score of the keyword of the news text in the plurality of dimensions including: a score of the keyword determined based on a correlation between a word obtained by segmenting the news text and a news title; filter a keyword set of news based on the weighted score value of the score of the keyword; search a pre-selected video using the keyword set of the news; and determine video material of the news based on the pre-selected video.

According to the method and apparatus for determining video material of news provided by the embodiments of the present disclosure, the weighted score value of the score of the keyword of the news text in the plurality of dimensions is first acquired, the score of the keyword of the news text in the plurality of dimensions including: the score of the keyword determined based on the correlation between the word obtained by segmenting the news text and the news title. Then, the keyword set of the news is filtered based on the weighted score value of the score of the keyword. Next, the pre-selected video is searched using the keyword set of the news. Finally, the video material of the news is determined based on the pre-selected video. According to the method for determining video material of news, when the video material of the news is determined, the keyword set of the news is filtered based on the weighted result of the score of the keyword in the plurality of dimensions. The score of the keyword in the plurality of dimensions includes: the score of the keyword determined based on the correlation between the word obtained by segmenting the news text and the news title. Therefore, the accuracy of the determined keyword set of the news may be improved, such that when the pre-selected video is searched according to the keyword set of the news, the consistency between the searched pre-selected video and the news text may be improved, and thus the consistency between the video material of the news and the news text is improved.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail by combining the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments. It should be understood by those skilled in the art that although the terms "first," "second," etc. may be used herein to describe various weight distribution models, searching units, determining units, recognizing units, etc., these weight distribution models, searching units, determining units and recognizing units should not be limited by these terms. These terms are only used to distinguish one weight distribution model, searching unit, determining unit and recognizing unit from other weight distribution models, searching units, determining units and recognizing units.

It should be noted that the modifications "a" and "a plurality of" mentioned in the present disclosure are illustrative, rather than restrictive. It should be understood by those skilled in the art that "a" and "a plurality of" should be understood as "one or more," unless explicitly stated otherwise in the context.

Figure 1:
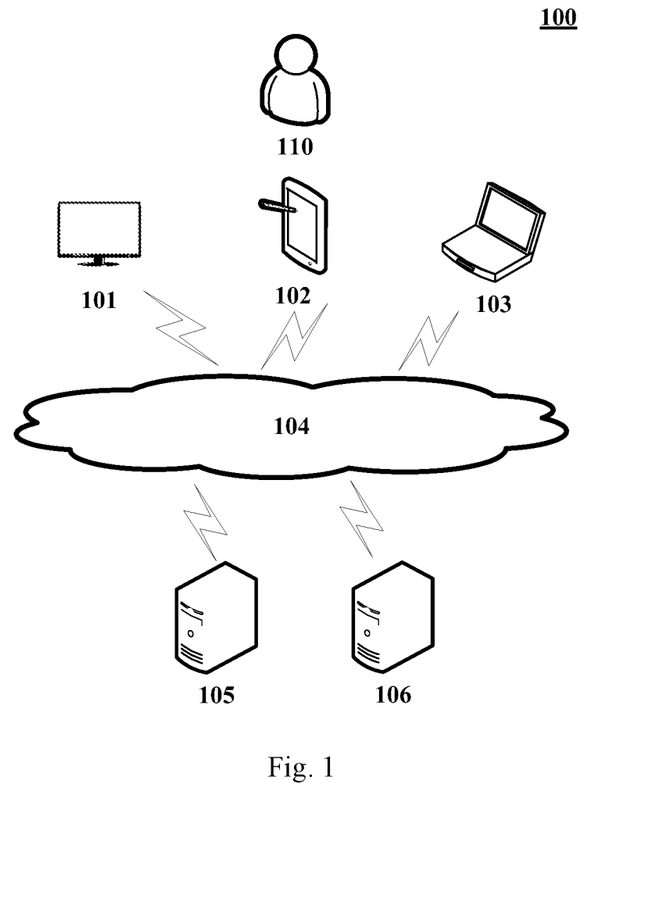
FIG. 1 is a diagram of an exemplary system architecture in which some embodiments of the present disclosure may be applied.

FIG. 1 shows a method and apparatus for determining video material of news in which embodiments of the present disclosure may be applied, and an exemplary system architecture 100 of the method and apparatus for determining video material of news.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 by using the terminal devices 101, 102 and 103, to receive or send messages. Various communication client applications (e.g., a search application, a deep learning application, a shopping application, an instant communication tool, a mailbox client and social platform software) may be installed on the terminal devices 101, 102 and 103.

The terminal devices 101, 102 and 103 may be hardware or software. When being the hardware, the terminal devices 101, 102 and 103 may be various electronic devices supporting various client applications, the electronic devices including, but not limited to, a tablet computer, a laptop portable computer and a desktop computer. When being the software, the terminal devices 101, 102 and 103 may be installed in the above-listed electronic devices. The terminal devices may be implemented as, for example, a plurality of pieces of software or a plurality of software modules for providing a distributed service, or as a single piece of software or a single software module, which will not be specifically defined here.

The server 105 may be a server providing various kinds of services, for example, a backend server providing support for a video search performed on the terminal devices 101, 102 and 103. The backend server may process (e.g., analyze) data such as a received search request, and feedback the processing result to the terminal devices.

It should be noted that the method for determining video material of news provided by the embodiments of the present disclosure may be performed by the terminal devices 101, 102 and 103, or may be performed by the server 105. Correspondingly, the apparatus for determining video material of news may be provided in the terminal devices 101, 102 and 103, or may be provided in the server 105, which will not be specifically defined here.

It should be noted that the server may be hardware or software. When being the hardware, the server may be implemented as a distributed server cluster composed of a plurality of servers, or as a single server. When being the software, the server may be implemented as, for example, a plurality of pieces of software or a plurality of software modules for providing a distributed service, or as a single piece of software or a single software module, which will not be specifically defined here.

It should be appreciated that the numbers of the terminal devices, the networks, and the servers in FIG. 1 are merely illustrative. Any number of terminal devices, networks and servers may be provided based on actual requirements.

Figure 2:
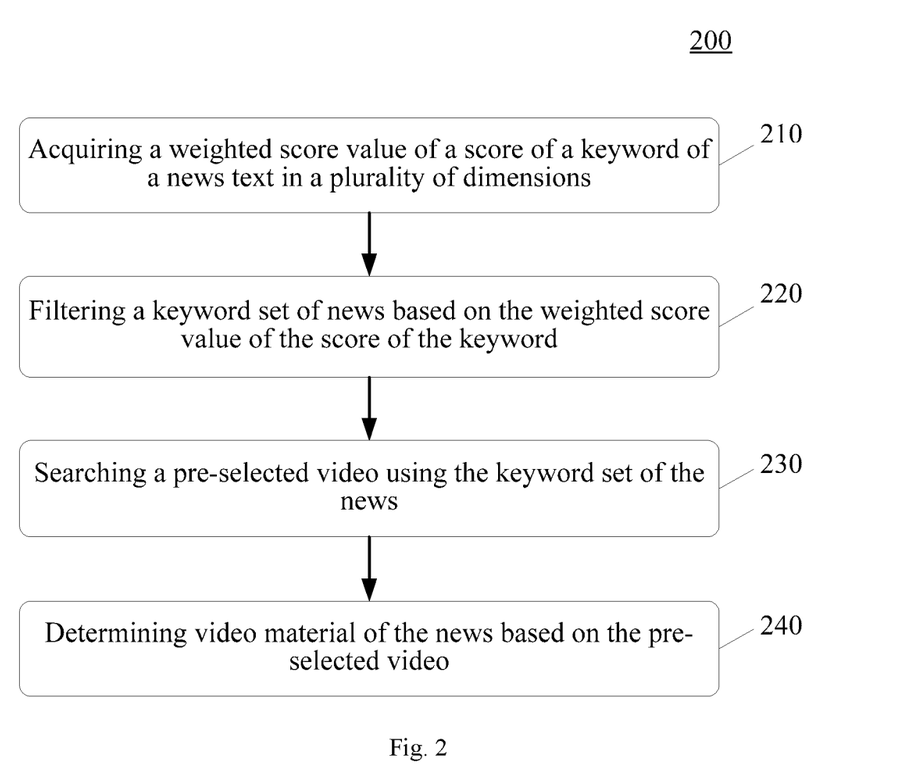
FIG. 2 is an exemplary flowchart of some embodiments of a method for determining video material of news according to the present disclosure.

Further referring to FIG. 2, FIG. 2 is an exemplary flowchart of some embodiments of a method for determining video material of news according to the present disclosure.

As shown in FIG. 2, the method 200 for determining video material of news includes the following steps:

Step 210, acquiring a weighted score value of a score of a keyword of a news text in a plurality of dimensions.

In this embodiment, an executing body (e.g., the terminal or server shown in FIG. 1) of the method for determining video material of news may first acquire the weighted score value of the score of the keyword of the news text in the plurality of dimensions. Here, the news text may include the full text of news. Alternatively or additionally, the news text may include a summary paragraph in the full text of the news. Here, the summary paragraph refers to a paragraph in the full text of the news, the paragraph providing an outline for the content of the news.

In practice, the score of the keyword of the news text in the plurality of dimensions may first be acquired. Then, the keyword weight corresponding to the acquired score of the keyword is acquired. Next, the product of the acquired score of the keyword and the keyword weight corresponding to the acquired score of the keyword is used as the weighted score value of the score of the keyword.

The score of the keyword here corresponds to the keyword. For example, for the exemplary news text "Fluctuation of Renminbi exchange rate intensifies," scores of keywords corresponding to the keywords may be acquired: ('Renminbi,' 7.15), ('Pan Gongsheng,' 5), ('Renminbi exchange rate,' 4.24), ('US Dollar,' 4.2), ('exchange rate,' 4.15), and ('foreign exchange,' 1.6). Here, 'Renminbi,' 'Pan Gongsheng,' 'Renminbi exchange rate,' 'US Dollar,' 'exchange rate,' and 'foreign exchange' are the keywords, and 7.15 corresponding to 'Renminbi,' 5 corresponding to 'Pan Gongsheng,' 4.24 corresponding to 'Renminbi exchange rate,' 4.2 corresponding to 'US Dollar,' 4.15 corresponding to 'exchange rate' and 1.6 corresponding to 'foreign exchange' are the scores of the keywords.

The score of the keyword of the news text in the plurality of dimensions may be acquired using a different method of extracting a score of a keyword. The score of the keyword in the plurality of dimensions may include: a score of the keyword determined based on a correlation between a word obtained by segmenting the news text and a news title.

The method of extracting the score of the keyword here is used to evaluate an importance of a segmented word to a file in a file set or a corpus, and may be a mechanism for extracting a keyword and scoring the keyword in the existing technology or a technology developed in the future, which will not defined in the present disclosure. For example, the method of scoring by extracting the keyword may be a method of scoring by extracting the keyword based on a TF-IDF (term frequency-inverse document frequency), a method of scoring by extracting the keyword based on an attention mechanism, or a method of scoring by extracting the keyword based on a domain dictionary of a different granularity.

In some alternative implementations of this embodiment, the acquiring a weighted score value of a score of a keyword of a news text in a plurality of dimensions includes at least one of: acquiring the score of the keyword of the news text using an attention model of extracting the keyword; acquiring the score of the keyword of the news text using a TF-IDF; or acquiring the score of the keyword of the news text using a domain dictionary of a different granularity.

In this implementation, the acquiring the score of the keyword of the news text using an attention model of extracting the keyword may include: acquiring, using the attention model of extracting the keyword, the score of the keyword determined based on the correlation between the word obtained by segmenting the news text and the news title.

When the score of the keyword of the news text is acquired using the attention model of extracting the keyword, the attention model for extracting the keyword may be pre-trained based on the attention mechanism.

Here, the core purpose of the attention mechanism is to select, from a large number of information, information that is more critical to the current mission objective.

Specifically, the attention mechanism imagines the constituent elements in the news text as being composed of a series of <Key, Value> data pairs. For a certain word in the news text, by calculating and querying a similarity or relevance between the word and each Key, the weight coefficient of the Value corresponding to each Key is obtained, and then a weighted sum is performed on the Value, to obtain a final attention numerical value.

In some specific examples, the attention model pre-trained based on the attention mechanism may be an RNN model, an LSTM model, or a self-attention model. The self-attention model uses the Value to represent the correlation weight of a word itself and other words in the sentence, which may enhance the long range dependence in the sentence.

After the attention model is obtained, the news text may be inputted into the attention model to obtain the score of the keyword of the news text. Here, when trained, the attention model introduces the score of the keyword of the news text determined based on the correlation between the word obtained by segmenting the news text and the news title.

In some specific examples, for the acquiring the score of the keyword of the news text using an attention model of extracting the keyword, the score of the word obtained by segmenting the news text using different word segmentation tools may first be acquired. Then, the segmented-word weight corresponding to the score of the obtained word is acquired. Finally, the product of the score of the obtained word and the weight corresponding to the score of the obtained word is used as the score of the keyword of the news text.

Here, the word segmentation tools may include, but not limited to, at least one of: a word segmentation tool based on the score of the length of the obtained word, a word segmentation tool based on the score of the correlation between the obtained word and the news title, or a word segmentation tool based on the scoring, by the attention mechanism, on the word obtained by segmenting the news text.

In some specific examples, the weight corresponding to the score of the obtained word is acquired using a first weight distribution model. Here, the first weight distribution model is configured to: predict the weight corresponding to the score of the obtained word based on the score of the word obtained by segmenting the news text using various word segmentation tools.

Here, the first weight distribution model is a machine learning model having a weight distribution capability after training. The first weight distribution model is used to obtain the weight corresponding to the score of the obtained word based on the score of the word obtained by segmenting the news text using various word segmentation tools.

Machine learning is abbreviated as ML in English. The machine learning model may have a discrimination capability through sample learning. For example, the score of the obtained word, of which the weighted is labeled, is used as a training sample to train the first weight distribution model.

The machine learning model may use a neural network model, a support vector machine, or a logistic regression model. For example, neural network models include a convolutional neural network, a backpropagation neural network, a feedback neural network, a radial basis neural network, or a self-organizing neural network.

In the first weight distribution model, the input may be the score of the word obtained by segmenting the news text using various word segmentation tools, and the output may be the weight corresponding to the score of the obtained word.

In a specific example, for the exemplary news text "Fluctuation of Renminbi exchange rate intensifies," the scores of the keywords of the news text are acquired using the attention model of extracting the keyword, the scores including: ('Pan Gongsheng,' 1.660498058572882), ('Renminbi,' 1.44), ('Renminbi exchange rate,' 1.181622937791565), ('exchange rate,' 1.152657900783809) and ('foreign exchange,' 1).

Alternatively or additionally, the score of the keyword of the news text may be acquired using the TF-IDF. Here, a term frequency (TF) is the frequency of occurrences of a certain word in the news text. For example, the term frequency may be obtained by dividing the number of occurrences of the word in the news text by the total number of words in the news text. Alternatively, the term frequency may be obtained by dividing the number of occurrences of the word in the news text by the number of occurrences of the word occurring most frequently in the news text.

The inverse document frequency (IDF) is to distribute an importance weight to each word on the basis of the term frequency. The size of the weight is inversely proportional to the common degree of the word. For example, the total number of documents in the corpus may be used as a numerator, and the sum of the number of documents containing the word and 1 may be used as a denominator, to obtain a fraction. Then, the logarithm of the fraction is taken to obtain the inverse document frequency. The more common the word is, the larger the denominator is, and the smaller and the more close to 0 the inverse document frequency is. The reason why 1 is added to the denominator is to avoid that the denominator is 0 (i.e., all documents do not contain the word).

The TF-IDF value of the word is obtained by multiplying the term frequency (TF) and the inverse document frequency (IDF). The TF-IDF is proportional to the number of occurrences of the word in a document, and is inversely proportional to the number of occurrences of the word in the entire language. Therefore, when the score of the keyword of the news text is obtained using the TF-IDF, the TF-IDF values of the words in the news text may be calculated. Then the TF-IDF values are arranged in a descending order, and words corresponding to the TF-IDF values arranged at the top and the TF-IDF values are taken.

In a specific example, for the words in the exemplary news text "Fluctuation of Renminbi exchange rate intensifies," the scores of the keywords of the news text acquired using the TF-IDF include: ('Renminbi,' 13.83584035944487), ('US Dollar,' 10.93097246392723), ('exchange rate,' 8), ('trading war,' 6.89311827460403), and ('foreign exchange reserve,' 6).

Alternatively or additionally, the score of the keyword of the news text may be acquired using the domain dictionary of the different granularity. The domain dictionary may include a domain feature word and the weight of the domain feature word in this field. The domain dictionary of the different granularity may correspond to a different classification domain. The domain dictionary here may be a domain dictionary in the existing technology or a technology developed in the future, which will not be limited in the present disclosure.

In a specific example, for the words in the exemplary news text "Fluctuation of Renminbi exchange rate intensifies," the domain dictionary of the field of finance and economics and the domain dictionary of the financial field may be at least used to acquire the scores of the keywords of the news text respectively.

Specifically, the scores of the keywords of the news texts acquired using the domain dictionary of the field of finance and economics include: ('exchange rate,' 15.42398901911574), ('Renminbi,' 14.63570371944869), ('Renminbi exchange rate,' 8), ('assets,' 7.190205360811407), ('foreign exchange,' 5.851363471802781), ('Renminbi assets,' 5.49715546900132), ('market,' 5.464421357963174), ('policy,' 5.168776549868846), ('Pan Gong,' 4.331471884500937), ... , and ('index,' 3.002470038743997).

The scores of the keywords of the news texts acquired using the domain dictionary of the financial field include: ('Renminbi,' 1.154106602644322), ('2018,' 1), ('speed accelerates,' 1), ('foreign exchange market,' 1), ('statistics show,' 1), ('Renminbi exchange rate,' 1), ('US dollar index,' 1), ('confident,' 1), ('People's Bank of China,' 1), ('strong US dollar,' 1), ('have friends,' 1), . . . , and ('offshore,' 0.9612367209359448).

In some alternative implementations of the embodiment, the acquiring a weighted score value of a score of a keyword of a news text in a plurality of dimensions includes: acquiring a keyword weight corresponding to the acquired score of the keyword using a second weight distribution model. Here, the second weight distribution model is configured to: predict the keyword weight corresponding to the acquired score of the keyword based on the score of the keyword of the news text in the plurality of dimensions.

In this implementation, the acquired score of the keyword, of which the weighted is labeled, may be used as a training sample to train the second weight distribution model.

Here, the second weight distribution model is a machine learning model having a weight distribution capability after training. The second weight distribution model is used to obtain the keyword weight corresponding to the acquired score of the keyword based on the score of the keyword of the news text in the plurality of dimensions.

Machine learning is abbreviated as ML in English. The machine learning model may have a discrimination capability through sample learning. The machine learning model may use a neural network model, a support vector machine, or a logistic regression model. For example, neural network models include a convolutional neural network, a backpropagation neural network, a feedback neural network, a radial basis neural network, or a self-organizing neural network.

In the second weight distribution model, the input may be the score of the keyword of the news text in the plurality of dimensions, and the output may be the keyword weight corresponding to the acquired score of the keyword.

Step 220, filtering a keyword set of news based on the weighted score value of the score of the keyword.

In this embodiment, the weighted score value of the score of the keyword corresponds to the keyword. Here, the weighted score value of the score of the keyword is the product of the acquired score of the keyword and the keyword weight corresponding to the acquired score of the keyword.

After acquiring the weighted score values of scores of keywords, the executing body may sort the weighted score values of the scores of the keywords in a descending order, and use the keywords corresponding to the weighted score values of the scores of a predetermined number of keywords ranking high as the keyword set of the news.

Step 230, searching a pre-selected video using the keyword set of the news.

In this embodiment, the executing body may use the keyword set of the news as keywords of searching the pre-selected video, to search a pre-selected video matching the keywords in the keyword set. The searched pre-selected video matches at least some of the keywords in the keyword set.

Step 240, determining video material of the news based on the pre-selected video.

In this embodiment, the executing body may directly use the pre-selected video as the video material of the news, or may use the pre-selected video that is further processed or filtered as the video material of the news.

When being further processed or filtered, the pre-selected video may be processed according to a preset processing rule or filtering rule. The processing rule or the filtering rule herein may be set by those skilled in the art according to experience or an application scenario, which will not be repeatedly described here.

In some alternative implementations of this embodiment, the determining video material of the news based on the pre-selected video includes: acquiring a video description information set for the pre-selected video, and determining a video in the video description information set as the video material of the news, the video including the keyword set of the news.

In this implementation, the video description information set includes: a recognition result obtained by performing named entity recognition on meta information of the pre-selected video; and/or a tag of the pre-selected video.

Here, the named entity recognition (NER) is to recognize a nomenclature reference item from the news text. Narrow named entity recognition is to recognize three types of named entities: person name, place name, and organization name (an type of entity such as time and currency names having an obvious regularity of composition may be recognized using a regular expression, etc.). In a particular field, various entity types that need to be recognized in the field may be correspondingly defined.

The named entity recognition may be implemented using a method of recognizing an entity in a text in the existing technology or a technology developed in the future, which will not be limited in the present disclosure. For example, the named entity recognition may complete the recognition on an entity in the news text using any of: a rule based method, a feature template based method, and a neural network based method.

Specifically, the rule based method may be to match, based on a manually written rule, the text and the rule to recognize a named entity. For example, for Chinese, a recognition rule may include: words such as "say" and "teacher" may be followed by the person name; and words such as "university" and "hospital" may be used as the end of the organization name. The recognition rule may further include: part-of-speech information; syntactic information, etc. The recognition rules of different languages constructed based on linguistic knowledge are not the same, and thus the conflict between the rules needs to be taken into consideration.

For the feature template based method, NER may be regarded as a sequence labeling task through statistics on machine learning methods, and a labeling model may be learned using a large-scale corpus, so as to label each position of the sentence. Commonly used models applied to an NER task include a generative model (e.g., a hidden Markov model (HMM)), a discriminant model (e.g., a conditional random field model (CRF)), etc.

In some examples, the recognition on the named entity may be implemented using a scheme (feature template+ CRF). Here, the feature template usually refers to a manually defined binary feature function, attempting to mine the internal and contextual composition characteristics of the named entity. For a given position in the sentence, a position at which a feature is extracted is a window, i.e., a context position. Moreover, a new feature template may be formed by combining different feature templates.

Here, in the process of labeling a position, by using the information that is already labeled, the CRF may use Viterbi decoding to obtain an optimal sequence. When a feature is extracted at each position in the sentence, the value of a feature satisfying a condition is taken as 1, and the value of a feature not satisfying the condition is taken as 0. Next, the extracted feature is inputted into the CRF, and the shift of a modeling tag is implemented in the model training phase. Then, the each position of the inputted news text is labeled in the prediction phase.

According to the neural network based method, the approach to processing the sequence labeling task NER is to map the token from a discrete one-hot representation into low-dimensional space to become dense embedding. Then, an embedding sequence of the sentence is inputted into an RNN, and the feature is automatically extracted using a neural network. Next, a tag of each token is predicted using a Softmax.

The tag of the pre-selected video may be the keywords of the video filled in by a user releasing a video, or the keywords of the video labeled manually or using a machine learning model by the website or application program providing the video.

In this implementation, the video description information set of the pre-selected video may be compared with the keyword set of the news. When all the keywords in the keyword set of the news are present in the video description information in the video description information set, a video associated with the video description information set is used as the video material of the news. At this point, the video associated with the video description information set is more in line with the keyword of the news, and thus the obtained video material of the news is more accurate.

An exemplary application scenario of the method for determining video material of news according to the present disclosure is described below in combination with FIG. 3.

Figure 3:
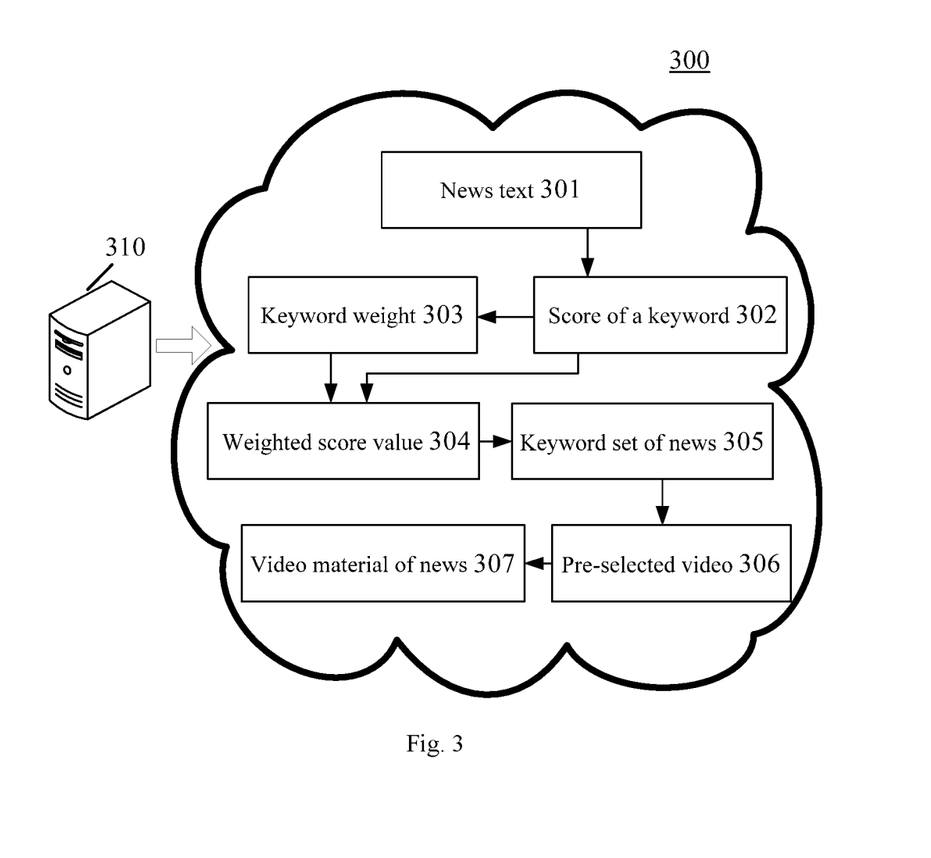
FIG. 3 is a schematic diagram of some application scenarios of the method for determining video material of news according to the embodiments of the present disclosure.

As shown in FIG. 3, FIG. 3 is a schematic flowchart of some application scenarios of the method for determining video material of news according to the present disclosure.

As shown in FIG. 3, the method 300 for determining video material of news runs in the electronic device 310, and may include:

First, the score 302 of the keyword of the news text 301 in a plurality of dimensions and the keyword weight 303 corresponding to the acquired score of the keyword are acquired. Here, the score 302 of the keyword of the news text 301 in the plurality of dimensions includes: a score of the keyword determined based on a correlation between a word obtained by segmenting the news text and a news title.

Then, the product of the acquired score 302 of the keyword and the keyword weight 303 corresponding to the acquired score of the keyword is used as the weighted score value 304 of the score of the keyword.

Next, based on the weighted score value 304 of the score of the keyword, the keyword set 305 of the news is filtered.

Then, the pre-selected video 306 is searched using the keyword set 305 of the news.

Finally, based on the pre-selected video 306, the video material 307 of the news is determined.

It should be understood that the application scenario of the method for determining video material of news shown in FIG. 3 is merely an exemplary description for the method for determining video material of news, and does not represent a limitation to the method. For example, the score 302 of the keyword of the news text 301 in the plurality of dimensions and the keyword weight 303 corresponding to the acquired score of the keyword may be respectively acquired through the following steps: acquiring the score 302 of the keyword of the news text 301 in the plurality of dimensions; and acquiring the keyword weight 303 corresponding to the acquired score of the keyword. Here, each step may be implemented through a plurality of sub-steps, which will not be limited in the present disclosure.

According to the method for determining video material of news provided by the above embodiment of the present disclosure, the weighted score value of the score of the keyword in the plurality of dimensions is taken into consideration when the keyword set of the news is filtered, and the score of the keyword determined based on the correlation between the word obtained by segmenting the news text and the news title is taken into consideration when the weighted score value of the score of the keyword in the plurality of dimensions is calculated. Therefore, the accuracy of the news text represented by the determined keyword set of the news is improved. Thus, the matching degree between the video material of the news determined according to the keyword set of the news and the news text may be improved.

Figure 4:
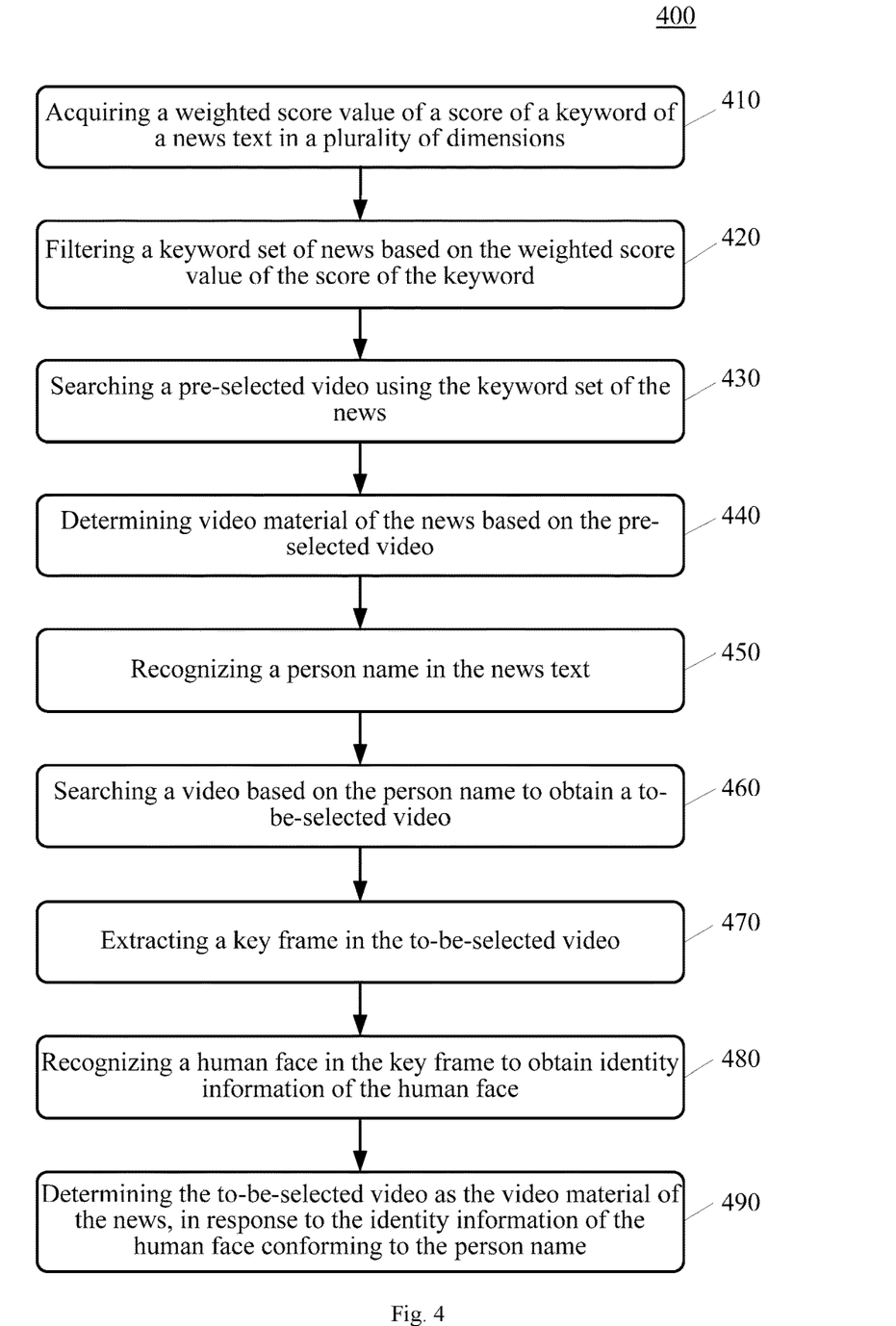
FIG. 4 is an exemplary flowchart of some embodiments of the method for determining video material of news according to the present disclosure.

Referring to FIG. 4, FIG. 4 is an exemplary flowchart of some embodiments of the method for determining video material of news according to the present disclosure.

As shown in FIG. 4, the method 400 for determining video material of news in this embodiment may include:

Step 410, acquiring a weighted score value of a score of a keyword of a news text in a plurality of dimensions.

In this embodiment, an executing body (e.g., the terminal or server shown in FIG. 1) of the method for determining video material of news may first acquire the weighted score value of the score of the keyword of the news text in the plurality of dimensions.

In practice, the score of the keyword of the news text in the plurality of dimensions may first be acquired. Then, the keyword weight corresponding to the acquired score of the keyword is acquired. Next, the product of the acquired score of the keyword and the keyword weight corresponding to the acquired score of the keyword is used as the weighted score value of the score of the keyword.

Step 420, filtering a keyword set of news based on the weighted score value of the score of the keyword.

In this embodiment, the weighted score value of the score of the keyword corresponds to the keyword. Here, the weighted score value of the score of the keyword is the product of the acquired score of the keyword and the keyword weight corresponding to the acquired score of the keyword.

After acquiring the weighted score values of scores of keywords, the executing body may sort the weighted score values of the scores of the keywords in a descending order, and use the keywords corresponding to the weighted score values of the scores of a predetermined number of keywords ranking high as the keyword set of the news.

Step 430, searching a pre-selected video using the keyword set of the news.

In this embodiment, the executing body may use the keyword set of the news as keywords of searching the pre-selected video, to search a pre-selected video matching the keywords in the keyword set. The searched pre-selected video matches at least some of the keywords in the keyword set.

Step 440, determining video material of the news based on the pre-selected video.

In this embodiment, the executing body may directly use the pre-selected video as the video material of the news, or may use the pre-selected video that is further processed or filtered as the video material of the news.

When being further processed or filtered, the pre-selected video may be processed according to a preset processing rule or filtering rule. The processing rule or the filtering rule herein may be set by those skilled in the art according to experience or an application scenario, which will not be repeatedly described here.

It should be understood by those skilled in the art that steps 410-440 respectively correspond to steps 210-240 in the embodiment shown in FIG. 2, and therefore, the operations and features described for steps 210-240 in FIG. 2 are also applicable to steps 410-440, which will not be repeatedly described here.

Step 450, recognizing a person name in the news text.

In this embodiment, the person name in the news text may be recognized using a method for recognizing a person name in a text in the existing technology or a technology developed in the future, which will not be limited in the present disclosure. For example, named entity recognition is performed on the news text to obtain the person name in the news text. Alternatively, the person name in the news text is determined based on a rule set of the recognizing on the person name.

The named entity recognition (NER) is to recognize a nomenclature reference item from the news text. Narrow named entity recognition is to recognize three types of named entities: person name, place name, and organization name (an type of entity such as time and currency names having an obvious regularity of composition may be recognized using a regular expression, etc.). In a particular field, various entity types that need to be recognized in the field may be correspondingly defined.

The named entity recognition may be implemented using a method of recognizing an entity in a text in the existing technology or a technology developed in the future, which will not be limited in the present disclosure. For example, the named entity recognition may complete the recognition on an entity in the news text using any of: a rule based method, a feature template based method, and a neural network based method.

Specifically, the rule based method may be to match, based on a manually written rule, the text and the rule to recognize a named entity. For example, for Chinese, a recognition rule may include: words such as "say" and "teacher" may be followed by the person name; and words such as "university" and "hospital" may be used as the end of the organization name. The recognition rule may further include: part-of-speech information; syntactic information, etc. The recognition rules of different languages constructed based on linguistic knowledge are not the same, and thus the conflict between the rules needs to be taken into consideration.

For the feature template based method, NER may be regarded as a sequence labeling task through statistics on machine learning methods, and a labeling model may be learned using a large-scale corpus, so as to label each position of a sentence. Commonly used models applied to an NER task include a generative model (e.g., a hidden Markov model (HMM)), a discriminant model (e.g., a conditional random field model (CRF)), etc.

In some examples, the named entity recognition may be implemented using a scheme (feature template+CRF). Here, the feature template usually refers to a manually defined binary feature function, attempting to mine the internal and contextual composition characteristics of the named entity. For a given position in the sentence, a position at which a feature is extracted is a window, i.e., a context position. Moreover, a new feature template may be formed by combining different feature templates.

Here, in the process of labeling a position, by using the information that is already labeled, the CRF may use Viterbi decoding to obtain an optimal sequence. When a feature is extracted at each position in the sentence, the value of a feature satisfying a condition is taken as 1, and the value of a feature not satisfying the condition is taken as 0. Next, the extracted feature is inputted into the CRF, and the shift of a modeling tag is implemented in the model training phase. Then, the each position of the inputted news text is labeled in the prediction phase.

According to the neural network based method, the approach to processing the sequence labeling task NER is to map a token from a discrete one-hot representation into low-dimensional space to become dense embedding. Then, an embedding sequence of the sentence is inputted into an RNN, and the feature is automatically extracted using a neural network. Next, a tag of each token is predicted using a Softmax.

By using the named entity recognition methods, the named entity recognition may be performed on the news text, to obtain the person name of in the news text.

When the person name in the news text is determined based on the rule set of the recognizing on the person name, the rule set may be first established based on frequency information, context information, corpus statistical information, and part-of-speech information of a word for a name. Then, the person name in the news text is determined based on the rule set.

In some specific examples, the composition of a Chinese person name, the regularity of words for names, and the feature of contextual text information may first be fully analyzed. On this basis, two rule sets are established. The two rule sets are applied to a test text to obtain a preliminary recognition result. The probability filtering is then performed on the preliminary recognition result using the statistical information of a large-scale corpus. An appropriate threshold is set to output the final recognition result.

Step 460, searching a video based on the person name to obtain a to-be-selected video.

In this embodiment, by using the person name as a keyword, the to-be-selected video may be searched in a video library via a webpage, an application program, or other call interfaces.

Step 470, extracting a key frame in the to-be-selected video.

In this embodiment, in order to verify whether the to-be-selected video is a video meeting the needs of the news text, the key frame in the to-be-selected video may be extracted so as to determine whether a human face in the key frame conforms to the person name in the news text.

Here, the key frame refers to a frame in which a key action of the movement or change of a character or object occurs. Alternatively, the key frame refers to a video frame extracted from the to-be-selected video at an interval of a predetermined number of frames.

Step 480, recognizing a human face in the key frame to obtain identity information of the human face.

In this embodiment, a face recognition technology in the existing technology or a technology developed in the future may be used to recognize the human face in the key frame and obtain the identity information of the human face in the key frame, which will not be limited in the present disclosure.

Step 490, determining the to-be-selected video as the video material of the news, in response to the identity information of the human face conforming to the person name.

In this embodiment, if the identity information of the human face conforms to the person name recognized from the news text, it indicates that the to-be-selected video conforms to the description for the news text, and thus the to-be-selected video may be determined as the video material of the news. On the contrary, if the identity information of the human face does not conform to the person name recognized from the news text, it indicates that the to-be-selected video is only a video having the same name as the person name in the news text, and cannot accurately conform to the person name in the news text. Thus, the to-be-selected video cannot be determined as the required video material of the news.

The differences between the method for determining video material of news in the above embodiment of the present disclosure and the embodiment shown in FIG. 2 lie in that, on the basis of the determination of the video material of the news in FIG. 2, the to-be-selected video may be searched based on the person name in the news text, and then the video material of the news may be determined according to whether the identity information of the human face in the key frame of the to-be-selected video conforms to the person name. According to the method for determining video material of news, it is avoided that the content of the determined video material of the news is not related to the news text, and the fit between the video material of the news and the news text is improved.

In some alternative implementations of the above embodiments, the method for determining video material of news further includes: segmenting, in response to a play duration of the video material of the news exceeding a play duration required by the news, the video material of the news based on a video frame having a changed scene in the video material of the news; and updating the video material of the news using the segmented video material.

In this implementation, if the play duration of the video material of the news exceeds the play duration required by the news, the video material of the news may be segmented, to obtain the video material of the news conforming to the required play duration.

When the segmentation is performed, the video material of the news may be segmented according to the video frame having the changed scene in the video material of the news, such that the scene represented by the video material of the news obtained after the segmentation is complete, thereby improving the quality of the updated video material of the news.

In some alternative implementations of the above embodiments, the video material of the news is played when the news text is broadcasted.

In this implementation, the played video material of the news is determined based on the method for determining video material of news. Therefore, the played video material of the news is more in line with the broadcasted news text.

Figure 5:
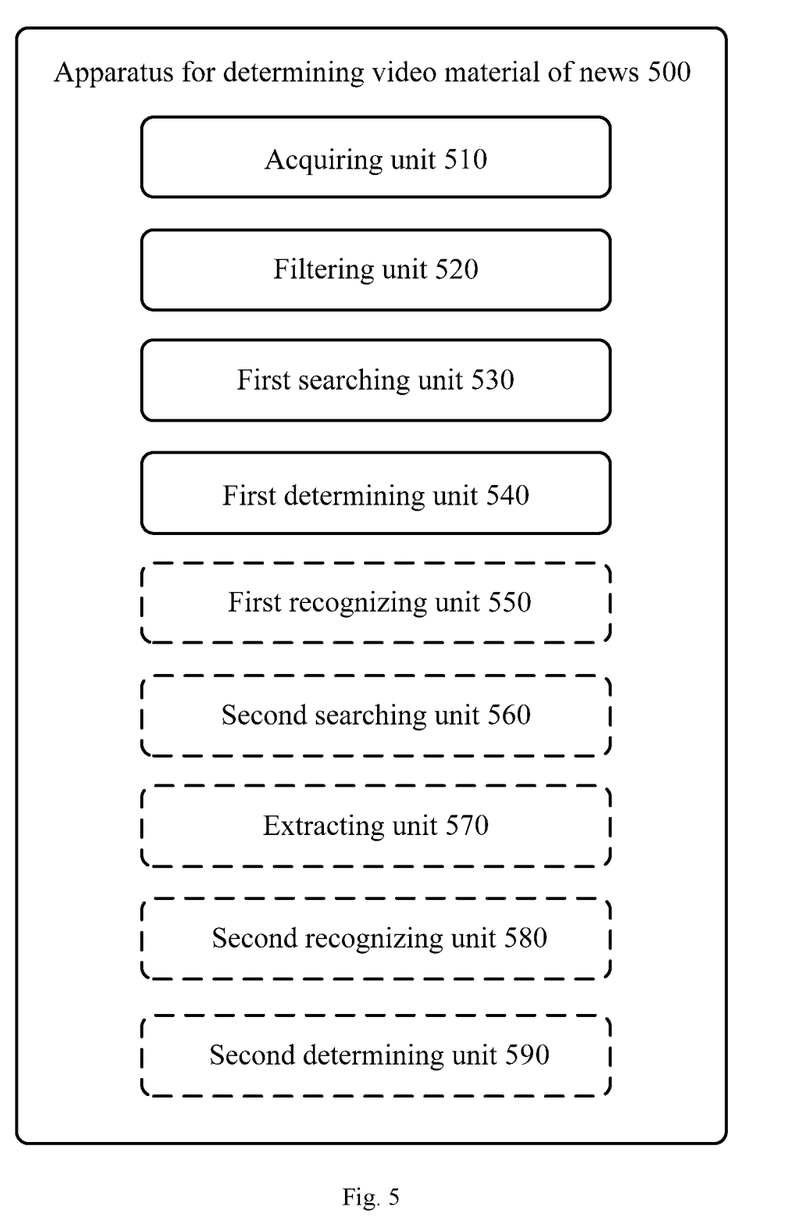
FIG. 5 is an exemplary structural diagram of some embodiments of an apparatus for determining video material of news according to the present disclosure.

Further referring to FIG. 5, as an implementation of the method shown in the above drawings, the present disclosure provides some embodiments of an apparatus for determining video material of news. The embodiments of the apparatus correspond to the embodiments of the method shown in FIGS. 2-4, and the apparatus may be applied in various electronic devices.

As shown in FIG. 5, the apparatus 500 for determining video material of news in this embodiment may include: an acquiring unit 510, configured to acquire a weighted score value of a score of a keyword of a news text in a plurality of dimensions, the score of the keyword of the news text in the plurality of dimensions including: a score of the keyword determined based on a correlation between a word obtained by segmenting the news text and a news title; a filtering unit 520, configured to filter a keyword set of news based on the weighted score value of the score of the keyword; a first searching unit 530, configured to search a pre-selected video using the keyword set of the news; and a first determining unit 540, configured to determine video material of the news based on the pre-selected video.

In some alternative implementations of this embodiment, the acquiring unit 510 is further configured to perform at least one of: acquiring the score of the keyword of the news text using an attention model of extracting the keyword, wherein the acquiring the score of the keyword of the news text using an attention model of extracting the keyword includes acquiring, using the attention model of extracting the keyword, the score of the keyword determined based on the correlation between the word obtained by segmenting the news text and the news title; acquiring the score of the keyword of the news text using a TF-IDF; or acquiring the score of the keyword of the news text using a domain dictionary of a different granularity.

In some alternative implementations of this embodiment, the acquiring unit 510 is further configured to: acquire a score of the word obtained by segmenting the news text using at least one of following word segmentation tools: a word segmentation tool based on a score of a length of the obtained word; a word segmentation tool based on a score of a correlation between the obtained word and the news title; and a word segmentation tool based on scoring, by an attention mechanism, on the word obtained by segmenting the news text; acquire a weight corresponding to the score of the obtained word; and use a product of the score of the obtained word and the weight corresponding to the score of the obtained word as the score of the keyword of the news text.

In some alternative implementations of this embodiment, the acquiring unit 510 is further configured to: acquire the weight corresponding to the score of the obtained word using a first weight distribution model, the first weight distribution model being configured to: predict the weight corresponding to the score of the obtained word based on the score of the word obtained by segmenting the news text using various word segmentation tools.

In some alternative implementations of this embodiment, the acquiring unit 510 is further configured to: acquire a keyword weight corresponding to the acquired score of the keyword using a second weight distribution model, the second weight distribution model being configured to: predict the keyword weight corresponding to the acquired score of the keyword based on the score of the keyword of the news text in the plurality of dimensions.

In some alternative implementations of this embodiment, the first determining unit 540 is further configured to: acquire a video description information set for the pre-selected video, the video description information set including: a recognition result obtained by performing named entity recognition on meta information of the pre-selected video; and/or a tag of the pre-selected video; and determine a video in the video description information set as the video material of the news, the video including the keyword set of the news.

In some alternative implementations of this embodiment, the apparatus further includes: a first recognizing unit 550, configured to recognize a person name in the news text; a second searching unit 560, configured to search a video based on the person name to obtain a to-be-selected video; an extracting unit 570, configured to extract a key frame in the to-be-selected video; a second recognizing unit 580, configured to recognize a human face in the key frame to obtain identity information of the human face; and a second determining unit 590, configured to determine the to-be-selected video as the video material of the news, in response to the identity information of the human face conforming to the person name.

In some alternative implementations of this embodiment, the apparatus further includes: a segmenting unit (not shown), configured to segment, in response to a play duration of the video material of the news exceeding a play duration required by the news, the video material of the news based on a video frame having a changed scene in the video material of the news; and an updating unit (not shown), configured to update the video material of the news using the segmented video material.

In some alternative implementations of this embodiment, the apparatus further includes: a playing unit (not shown), configured to play the video material of the news when the news text is broadcasted.

The embodiments of the present disclosure further provide an electronic device/terminal/server, including one or more processors; and a storage device, configured to store one or more programs. The one or more programs, when executed by the one or more processors, cause the one or more processors to implement the method described in any embodiment.

The embodiments of the present disclosure further provide a computer readable medium storing a computer program. The program, when executed by a processor, implements the method described in any embodiment.

The embodiments of the present disclosure further provide a server. The server includes: an interface; a storage device, storing one or more programs; and one or more processors, operatively connected to the interface and the storage device to: acquire a weighted score value of a score of a keyword of a news text in a plurality of dimensions, the score of the keyword of the news text in the plurality of dimensions including: a score of the keyword determined based on a correlation between a word obtained by segmenting the news text and a news title; filter a keyword set of news based on the weighted score value of the score of the keyword; search a pre-selected video using the keyword set of the news; and determine video material of the news based on the pre-selected video.

The embodiments of the present disclosure further provide a computer readable storage medium, storing a computer program. The computer program, when executed by one or more processors, causes the one or more processors to: acquire a weighted score value of a score of a keyword of a news text in a plurality of dimensions, the score of the keyword of the news text in the plurality of dimensions including: a score of the keyword determined based on a correlation between a word obtained by segmenting the news text and a news title; filter a keyword set of news based on the weighted score value of the score of the keyword; search a pre-selected video using the keyword set of the news; and determine video material of the news based on the pre-selected video.

Figure 6:
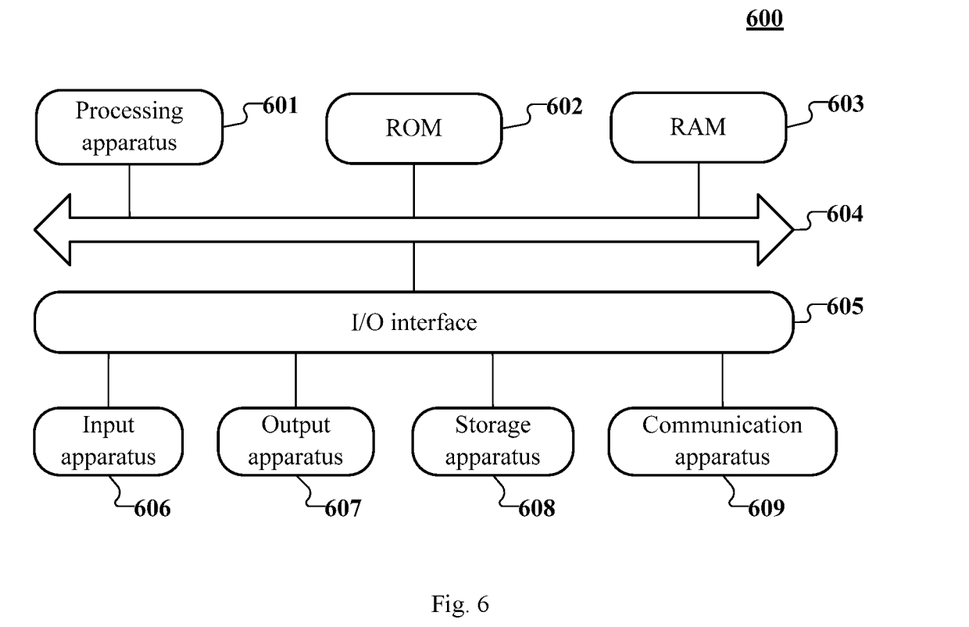
FIG. 6 is a schematic structural diagram of an electronic device/terminal/server adapted to implement embodiments of the present disclosure.

Referring to FIG. 6, FIG. 6 is a schematic structural diagram of an electronic device (e.g., the server or the terminal device shown in FIG. 1) 600 adapted to implement embodiments of the present disclosure. The terminal device in the embodiments of the present disclosure may include, but not limited to, a notebook computer and a desktop computer. The terminal device/server shown in FIG. 6 is merely an example, and should not bring any limitations to the functions and the scope of use of the embodiments of the present disclosure.

As shown in FIG. 6, the electronic device 600 includes a processing apparatus (e.g., a central processing unit and a graphics processing unit) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Usually, the following components are connected to the I/O interface 605: an input apparatus 606 including, for example, a touch screen, a touch pad, a keyboard, a mouse, a camera, a microphone, an accelerometer and a gyroscope; an output apparatus 607 including, for example, a liquid crystal display device (LCD), a speaker and a vibrator; a storage apparatus 608 including, for example, a tape and a hard disk; and a communication apparatus 609. The communication apparatus 609 may allow the electronic device 600 to exchange data through a wireless communication or a wired communication with other devices. Although FIG. 6 illustrates the electronic device 600 having various apparatuses, it should be understood that it is not required to implement or possess all of the illustrated apparatuses. More or less apparatuses may be alternatively implemented or possessed. Each of the blocks shown in FIG. 6 may represent one apparatus, or may represent a plurality of apparatuses as required.

In particular, according to the embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication apparatus 609, or may be installed from the storage apparatus 608, or may be installed from the ROM 602. The computer program, when executed by the processing apparatus 601, implements the above mentioned functionalities defined in the method of the embodiments of the present disclosure. It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, the command execution system, apparatus or element. The program codes contained on the computer readable medium may be transmitted with any suitable medium including, but not limited to, wireless, wired, optical cable, RF medium, or any suitable combination of the above.

The computer readable medium may be the computer readable medium included in the electronic device, or a stand-alone computer readable medium not assembled into the electronic device. The computer readable medium carries one or more programs. The one or more programs, when executed by the electronic device, cause the electronic device to: acquire a weighted score value of a score of a keyword of a news text in a plurality of dimensions, the score of the keyword of the news text in the plurality of dimensions including: a score of the keyword determined based on a correlation between a word obtained by segmenting the news text and a news title; filter a keyword set of news based on the weighted score value of the score of the keyword; search a pre-selected video using the keyword set of the news; and determine video material of the news based on the pre-selected video.

A computer program code for executing the operations according to the embodiments of the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequence shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks in the block diagrams and/or flowcharts may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor. For example, the processor may be described as: a processor comprising an acquiring unit, a filtering unit, a first searching unit, and a first determining unit. The names of these units do not in some cases constitute a limitation to such units themselves. For example, the acquiring unit may alternatively be described as "a unit for acquiring a weighted score value of a score of a keyword of a news text in a plurality of dimensions."

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A method for determining video material of news, comprising:
    acquiring a weighted score value of a score of a keyword of a news text in a plurality of dimensions, the score of the keyword of the news text in the plurality of dimensions including: a score of the keyword determined based on a correlation between a word obtained by segmenting the news text and a news title;
    filtering a keyword set of news based on the weighted score value of the score of the keyword;
    searching a pre-selected video using the keyword set of the news; and
    determining video material of the news based on the pre-selected video.

2. The method according to claim 1, wherein the acquiring a weighted score value of a score of a keyword of a news text in a plurality of dimensions includes at least one of:
    acquiring the score of the keyword of the news text using an attention model of extracting the keyword, the acquiring the score of the keyword of the news text using an attention model of extracting the keyword including: acquiring, using the attention model of extracting the keyword, the score of the keyword determined based on the correlation between the word obtained by segmenting the news text and the news title;
    acquiring the score of the keyword of the news text using a TF-IDF; or
    acquiring the score of the keyword of the news text using a domain dictionary of a different granularity.

3. The method according to claim 2, wherein the acquiring the score of the keyword of the news text using an attention model of extracting the keyword includes:
    acquiring a score of the word obtained by segmenting the news text using at least one of following word segmentation tools: a word segmentation tool based on a score of a length of the obtained word; a word segmentation tool based on a score of a correlation between the obtained word and the news title; and a word segmentation tool based on scoring, by an attention mechanism, on the word obtained by segmenting the news text;
    acquiring a weight corresponding to the score of the obtained word; and
    using a product of the score of the obtained word and the weight corresponding to the score of the obtained word as the score of the keyword of the news text.

4. The method according to claim 3, wherein the acquiring a weight corresponding to the score of the obtained word includes:
    acquiring the weight corresponding to the score of the obtained word using a first weight distribution model, the first weight distribution model being configured to: predict the weight corresponding to the score of the obtained word based on the score of the word obtained by segmenting the news text using various word segmentation tools.

5. The method according to claim 1, wherein the acquiring a weighted score value of a score of a keyword of a news text in a plurality of dimensions includes:
    acquiring a keyword weight corresponding to the acquired score of the keyword using a second weight distribution model, the second weight distribution model being configured to: predict the keyword weight corresponding to the acquired score of the keyword based on the score of the keyword of the news text in the plurality of dimensions.

6. The method according to claim 1, wherein the determining video material of the news based on the pre-selected video includes:
    acquiring a video description information set for the pre-selected video, the video description information set including: a recognition result obtained by performing named entity recognition on meta information of the pre-selected video; and/or a tag of the pre-selected video; and
    determining a video in the video description information set as the video material of the news, the video including the keyword set of the news.

7. The method according to claim 1, further comprising:
recognizing a person name in the news text;
searching a video based on the person name to obtain a to-be-selected video;
extracting a key frame in the to-be-selected video;
recognizing a human face in the key frame to obtain identity information of the human face; and
determining the to-be-selected video as the video material of the news, in response to the identity information of the human face conforming to the person name.

8. The method according to claim 1, further comprising:
segmenting, in response to a play duration of the video material of the news exceeding a play duration required by the news, the video material of the news based on a video frame having a changed scene in the video material of the news; and
updating the video material of the news using the segmented video material.

9. The method according to claim 1, further comprising:
playing the video material of the news when the news text is broadcasted.

10. The method according to claim 1, wherein the news text includes: a full text of the news and/or a summary paragraph in the full text of the news.

11. An apparatus for determining video material of news, comprising:
an acquiring unit, configured to acquire a weighted score value of a score of a keyword of a news text in a plurality of dimensions, the score of the keyword of the news text in the plurality of dimensions including: a score of the keyword determined based on a correlation between a word obtained by segmenting the news text and a news title;
a filtering unit, configured to filter a keyword set of news based on the weighted score value of the score of the keyword;
a first searching unit, configured to search a pre-selected video using the keyword set of the news; and
a first determining unit, configured to determine video material of the news based on the pre-selected video.

12. The apparatus according to claim 11, wherein the acquiring unit is further configured to perform at least one of:
acquiring the score of the keyword of the news text using an attention model of extracting the keyword, the acquiring the score of the keyword of the news text using an attention model of extracting the keyword including: acquiring, using the attention model of extracting the keyword, the score of the keyword determined based on the correlation between the word obtained by segmenting the news text and the news title;
acquiring the score of the keyword of the news text using a TF-IDF; or
acquiring the score of the keyword of the news text using a domain dictionary of a different granularity.

13. The apparatus according to claim 12, wherein the acquiring unit is further configured to:
acquire a score of the word obtained by segmenting the news text using at least one of following word segmentation tools: a word segmentation tool based on a score of a length of the obtained word; a word segmentation tool based on a score of a correlation between the obtained word and the news title; and a word segmentation tool based on scoring, by an attention mechanism, on the word obtained by segmenting the news text;
acquire a weight corresponding to the score of the obtained word; and
use a product of the score of the obtained word and the weight corresponding to the score of the obtained word as the score of the keyword of the news text.

14. The apparatus according to claim 13, wherein the acquiring unit is further configured to:
acquire the weight corresponding to the score of the obtained word using a first weight distribution model, the first weight distribution model being configured to: predict the weight corresponding to the score of the obtained word based on the score of the word obtained by segmenting the news text using various word segmentation tools.

15. The apparatus according to claim 11, wherein the acquiring unit is further configured to:
acquire a keyword weight corresponding to the acquired score of the keyword using a second weight distribution model, the second weight distribution model being configured to: predict the keyword weight corresponding to the acquired score of the keyword based on the score of the keyword of the news text in the plurality of dimensions.

16. The apparatus according to claim 11, wherein the first determining unit is further configured to:
acquire a video description information set for the pre-selected video, the video description information set including: a recognition result obtained by performing named entity recognition on meta information of the pre-selected video; and/or a tag of the pre-selected video; and
determine a video in the video description information set as the video material of the news, the video including the keyword set of the news.

17. The apparatus according to claim 11, further comprising:
a first recognizing unit, configured to recognize a person name in the news text;
a second searching unit, configured to search a video based on the person name to obtain a to-be-selected video;
an extracting unit, configured to extract a key frame in the to-be-selected video;
a second recognizing unit, configured to recognize a human face in the key frame to obtain identity information of the human face; and
a second determining unit, configured to determine the to-be-selected video as the video material of the news, in response to the identity information of the human face conforming to the person name.

18. The apparatus according to claim 11, further comprising:
a segmenting unit, configured to segment, in response to a play duration of the video material of the news exceeding a play duration required by the news, the video material of the news based on a video frame having a changed scene in the video material of the news; and
an updating unit, configured to update the video material of the news using the segmented video material.

19. The apparatus according to claim 11, further comprising:
a playing unit, configured to play the video material of the news when the news text is broadcasted.

20. A server, comprising: an interface;
a storage device, storing one or more programs; and one or more processors, operatively connected to the interface and the storage device to: acquire a weighted score value of a score of a keyword of a news text in a plurality of dimensions, the score of the keyword of the news text in the plurality of dimensions including: a score of the keyword determined based on a correlation between a word obtained by segmenting the news text and a news title; filter a keyword set of news based on the weighted score value of the score of the keyword; search a pre-selected video using the keyword set of the news; and determine video material of the news based on the pre-selected video.

21. A non-transitory computer readable storage medium, storing a computer program, wherein the computer program, when executed by one or more processors, causes the one or more processors to:

acquire a weighted score value of a score of a keyword of a news text in a plurality of dimensions, the score of the keyword of the news text in the plurality of dimensions including: a score of the keyword determined based on a correlation between a word obtained by segmenting the news text and a news title; filter a keyword set of news based on the weighted score value of the score of the keyword;

search a pre-selected video using the keyword set of the news;

and determine video material of the news based on the pre-selected video.

* * * * *